United States Patent
Tang

(10) Patent No.: US 10,295,879 B2
(45) Date of Patent: May 21, 2019

(54) BLUE PHASE MODE LIQUID CRYSTAL DISPLAY APPARATUS AND ITS DISPLAY MODULE

(71) Applicant: Wuhan China Star Optoelectronics Technology Co., Ltd., Wuhan, Hubei (CN)

(72) Inventor: Yuejun Tang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 14/891,660

(22) PCT Filed: Oct. 21, 2015

(86) PCT No.: PCT/CN2015/092358
§ 371 (c)(1),
(2) Date: Oct. 10, 2017

(87) PCT Pub. No.: WO2017/063203
PCT Pub. Date: Apr. 20, 2017

(65) Prior Publication Data
US 2018/0031874 A1 Feb. 1, 2018

(30) Foreign Application Priority Data

Oct. 13, 2015 (CN) .......................... 2015 1 0659147

(51) Int. Cl.
*G02F 1/137* (2006.01)
*G02F 1/1343* (2006.01)
*G02F 1/1335* (2006.01)

(52) U.S. Cl.
CPC ........ *G02F 1/137* (2013.01); *G02F 1/133555* (2013.01); *G02F 1/134309* (2013.01); *G02F 2001/13793* (2013.01); *G02F 2203/01* (2013.01)

(58) Field of Classification Search
CPC ............. G02F 1/1335; G02F 1/133553; G02F 1/133555; G02F 1/13439; G02F 1/133707;
(Continued)

(56) References Cited

U.S. PATENT DOCUMENTS

2010/0302492 A1 12/2010 Kubota et al.
2015/0323833 A1 11/2015 Xie
2016/0291425 A1 10/2016 Ma

FOREIGN PATENT DOCUMENTS

CN 101782702 A 7/2010
CN 102231027 A 11/2011
(Continued)

*Primary Examiner* — Thoi V Duong
(74) *Attorney, Agent, or Firm* — Andrew C. Cheng

(57) ABSTRACT

The invention discloses a blue phase liquid crystal display module, wherein the blue phase liquid crystal display module including: an upper substrate, a lower substrate and a blue phase liquid crystal; a plurality of the upper jagged electrodes formed on the upper substrate; a lower substrate is formed opposite to the upper substrate, a plurality of the lower jagged electrodes formed staggered with the upper jagged electrodes on the lower substrate; a reflection layer is formed on the lower substrate alternately to divide the blue phase liquid crystal display module into a transmission zone and a reflective zone. The invention achieves the property of different phase delay of the transmission zone to the reflective zone by adjusting the interval or dip angle of the electrode.

17 Claims, 4 Drawing Sheets

(58) Field of Classification Search
CPC ......... G02F 1/134309; G02F 1/133345; G02F 1/1341; G02F 2001/13793; G02F 2201/12; G02B 5/045
See application file for complete search history.

(56) References Cited

FOREIGN PATENT DOCUMENTS

| | | |
|---|---|---|
| CN | 202600306 U | 12/2012 |
| CN | 103969899 A | 8/2014 |

BLUE PHASE MODE LIQUID CRYSTAL DISPLAY APPARATUS AND ITS DISPLAY MODULE

BACKGROUND OF THE INVENTION

1. Field of the Invention

The present invention relates to the field of display technology, and more particularly to a blue phase mode liquid crystal display apparatus and its display module.

2. Description of Related Art

Comparing to the liquid crystal material wildly used now, the blue phase liquid crystal has four outstanding advantages as followed: (1) the response time of the blue phase liquid crystal is within sub-millisecond, and can reach high speed driving over 240 Hz without applying over drive technology, and can reduce the dynamic fuzzy in the motion picture. In adoption the RGB LED as a backlight source, no color filter is needed; a blue phase liquid crystal can achieve the time sequential color display. (2) The alignment layer for other display apparatus is no needed in the blue phase liquid crystal. The manufacturing process is simplified and the cost is reduced. (3) On a macro scale view, a blue phase liquid crystal is optical isotropy, and the blue phase liquid crystal display apparatus has the advantage of wild view angle and good dark state; (4) if the width of the blue phase liquid crystal box is over the penetration depth of the electric field, the influence of the changing of the width of the liquid crystal box can be ignore and the characteristic is suitable for the manufacturing of large screen display or a single plate type liquid crystal display apparatus.

However, in the conventional technology, the blue phase liquid crystal faces the problem of the higher driving voltage and the general solution in this filed now is to improve the performance of the blue phase liquid crystal or optimize the electrode structure. But for improving the performance of the blue phase liquid crystal such as preparing the blue phase liquid crystal material of larger Kerr's constant, it related to the complicate process of the synthesis of the material of the blue phase liquid crystal, for example, it need to consider the series of conditions of synthesis of the monomer, the photo initiator for the preparing of the polymer of the blue phase liquid crystal, and being a large cost for the research and development. For the optimization of the electrode structure is since the driving method is for the IPS structure, the penetrating depth of the lateral electric field by the parallel electrodes is limited, and a higher driving voltage and higher electric field is needed. Therefore, the IPS driving methods of the blue phase liquid crystal still need to be improved.

SUMMARY OF THE INVENTION

A blue phase mode liquid crystal display apparatus and its display module are provided to solve the conventional technology problem of the large driving voltage of the blue phase mode liquid crystal display apparatus.

To solve the problem mentioned above, the embodiments of the invention provides a blue phase liquid crystal display module, wherein the blue phase liquid crystal display module including: an upper substrate, a lower substrate and a blue phase liquid crystal; a plurality of the upper jagged electrodes formed on the upper substrate; a lower substrate is formed opposite to the upper substrate, a plurality of the lower jagged electrodes formed staggered with the upper jagged electrodes on the lower substrate; a reflection layer is formed on the lower substrate alternately to divide the blue phase liquid crystal display module into a transmission zone and a reflective zone. A blue phase liquid crystal formed between the upper jagged electrodes and the lower jagged electrodes; the pitch of the upper jagged electrodes and the lower jagged electrodes in the transmission zone is smaller than the pitch of the upper jagged electrodes and the lower jagged electrodes in the reflective zone; an electric field is formed between the upper jagged electrodes and the lower jagged electrodes to drive the blue phase liquid crystal to make the phase delay of the transmission zone is twice as the reflective zone and have a uniform electro-optical characteristics in the transmission zone and the reflective zone.

According to the preferred embodiment of this invention, a filler material formed between the upper jagged electrodes and the upper substrate According to the preferred embodiment of this invention, a filler material formed between the between the lower jagged electrodes and the lower substrate.

According to the preferred embodiment of this invention, the bottom of the upper jagged electrodes and the top of the lower jagged electrodes are corresponding formed in a proper order, and the distance of the adjacent jagged projection of the lower jagged electrodes in the reflective zone is larger than the distance of the adjacent jagged projection of the lower jagged electrodes in the transmission zone to make the pitch of the upper jagged electrodes and the lower jagged electrodes in the transmission zone is smaller than the pitch of the upper jagged electrodes and the lower jagged electrodes in the reflective zone.

According to the preferred embodiment of this invention, the bottom of the upper jagged electrodes and the top of the lower jagged electrodes are in stagger arrangement successively in a distance to make the pitch of the upper jagged electrodes and the lower jagged electrodes in the transmission zone is smaller than the pitch of the upper jagged electrodes and the lower jagged electrodes in the reflective zone.

According to the preferred embodiment of this invention, the bottom of the upper jagged electrodes and the top of the lower jagged electrodes are corresponding formed in a proper order, and the height of the projection in the transmission zone is larger than the height of the projection in the reflective zone, and makes the pitch of the upper jagged electrodes and the lower jagged electrodes in the transmission zone is smaller than the pitch of the upper jagged electrodes and the lower jagged electrodes in the reflective zone.

According to the preferred embodiment of this invention, the dip angle of the jagged electrodes in the transmission zone is larger than the dip angle of the jagged electrodes in the reflective zone.

According to the preferred embodiment of this invention, the dip angle of the jagged electrodes in the transmission zone is larger than 45 degree and the dip angle of the jagged electrodes in the reflective zone is smaller than 45 degree.

According to the preferred embodiment of this invention, the filler material is a transparent material.

To solve the problem mentioned above, the invention provides a blue phase liquid crystal display apparatus and the blue phase liquid crystal display apparatus includes a blue phase liquid crystal display module in the embodiment mentioned above.

Comparing to the conventional technology, the invention provide a blue phase liquid crystal display apparatus and its display module, by adjusting the different electrodes pitch or the dip angle to achieve the property of the phase delay of the transmission zone differ with that of the reflective zone. It makes the accumulated phase delay of the environment light pass the crystal twice and the environment light pass the crystal once being the same. By decreasing the driving voltage, the consistent of the electro-optical properties of the transmission zone and the reflective zone is also achieved.

BRIEF DESCRIPTION OF THE DRAWINGS

The following detailed descriptions accompanying drawings and the embodiment of the present invention make the aspect of the present invention and the other beneficial effect more obvious.

DETAILED DESCRIPTION OF THE PREFERRED EMBODIMENTS

The specific components or items are used in the specification and claims. Those skilled in the art can use other possible modifications and variations in the same components or items. The specification and claim will not distinguish the different terms to the items or components but by the functions. Following is the detail description illustrated by the figures and the embodiments.

Embodiment 1

Figure 1:
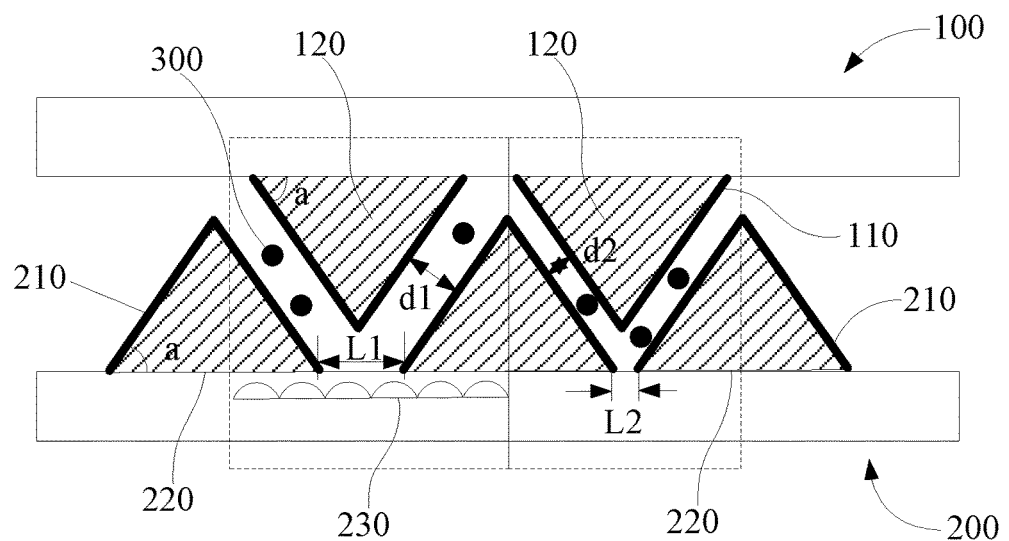
FIG. 1 is a cross-sectional view illustrating the blue phase liquid crystal display module of the first embodiment according to the present invention.

Referring to FIG. 1, FIG. 1 is a cross-sectional view illustrating the blue phase liquid crystal display module of the first embodiment according to the present invention. The blue phase liquid crystal display module includes but not limited to the following elements: an upper substrate 100, a lower substrate 200 and a blue phase liquid crystal 300.

To be more specifically, a plurality of the upper jagged electrodes 110 is formed on the upper substrate 100. The lower substrate 200 is formed opposed to the upper substrate 100. A plurality of the lower jagged electrodes 210 is formed staggered with the upper jagged electrodes 110 on the lower substrate 200. In this embodiment, the shape of the end face of the upper jagged electrodes 110 and the lower jagged electrodes 210 are the same. In other words, the dip angle a of the jagged projection of the upper jagged electrodes 110 and the lower jagged electrodes 210 are the same. Reflection layers 230 is formed alternately on the lower jagged electrodes 210, and divides the display module into a transmission zone and a reflective zone wherein the reflective zone is correspondence with the reflection layer 230.

A blue phase liquid crystal 300 is formed between the upper jagged electrodes 110 and the lower jagged electrodes 210. The pitch of the upper jagged electrodes 110 and the lower jagged electrodes 210 in the transmission zone is smaller than the pitch of the upper jagged electrodes 110 and the lower jagged electrodes 210 in the reflective zone. An electric field is formed between the upper jagged electrodes 110 and the lower jagged electrodes 210 to drive the blue phase liquid crystal 300. The phase delay of the transmission zone is twice as the reflective zone and makes the consistent of the electro-optical properties of the transmission zone and the reflective zone.

To be more specific, a filler material 120 is formed between the upper jagged electrodes 110 and the upper substrate 100, a filler material 220 is formed between the lower jagged electrodes 210 and the lower substrate 200 to make the upper jagged electrodes 110 and the lower jagged electrodes 210 being a solid structure. In a preferred embodiment, the filler material 120, 220 is a transparent material such as transparent resin, SiN, SiO2.

In this embodiment, the bottom of the upper jagged electrodes 110 and the top of the lower jagged electrodes 210 are corresponding formed in a proper order, and the distance L1 of the adjacent jagged projection of the lower jagged electrodes 210 in the reflective zone is larger than the distance L2 of the adjacent jagged projection of the lower jagged electrodes 210 in the transmission zone to make the pitch d2 of the upper jagged electrodes 110 and the lower jagged electrodes 210 in the transmission zone is smaller than the pitch d1 of the upper jagged electrodes 110 and the lower jagged electrodes 210 in the reflective zone. Of course, the distance of the lower jagged electrodes 210 in the lower substrate 200 can be fixed, and the relationship of pitch d1 larger than pitch d2 can be adjusted by changing the distance of the upper jagged electrodes 110 of the upper substrate 100.

Figure 2:
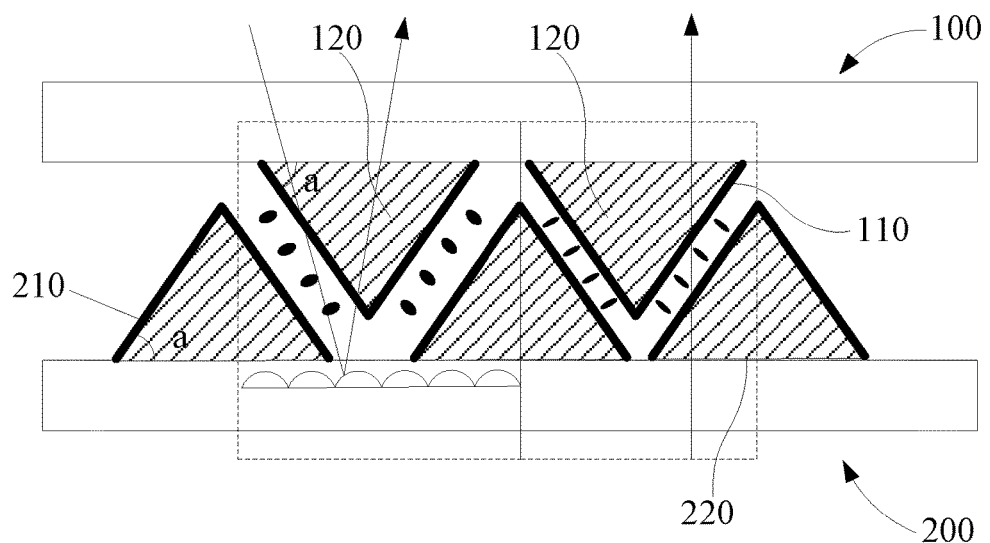
FIG. 2 is a cross-sectional view illustrating the blue phase liquid crystal display module in the energized state of the first embodiment according to the present invention illustrated in FIG.

Referring to FIG. 2, FIG. 2 is a cross-sectional view illustrating the blue phase liquid crystal display module in the energized state of the first embodiment according to the present invention illustrated in FIG. 1. In order to having the relationship d1>d2, wherein the pitch d2 is between the upper jagged electrodes 110 and the lower jagged electrodes 210 in the transmission zone and the pitch d1 is between the upper jagged electrodes 110 and the lower jagged electrodes 210 in the reflective zone. The distance L1/L2 of the adjacent jagged projection of the lower jagged electrodes 210 can be adjusted. By adjusting L1>L2 makes d1>d2. As shown in FIG. 1, when no voltage is applied on the upper jagged electrodes 110 and the lower jagged electrodes 210, the blue phase liquid crystal is optically isotropic and in a dark state. When a pixel signal or a common signal is applied on the upper jagged electrodes 110 and the lower jagged electrodes 210, the blue phase liquid crystal between the two electrodes is optically anisotropic. As shown in FIG. 2, since d1>d2, the electric field of the transmission zone is larger than the reflective zone, the optically isotropic property of the blue phase liquid crystal in the transmission zone is larger than the reflective zone. By controlling the relationship of d1>d2 (by adjusting L1>L2 in this embodiment), the phase delay of the transmission zone can be twice as the reflective zone, and have a uniform electro-optical characteristics in the transmission zone and the reflective zone. To be more specifically, a plurality of the testing panels can be formed with a pre-established d1/d2 or L1/L2 (by controlling L1/L2 to make d1≈2d2), and the blue phase liquid crystal is filled in the testing panels. The V-T (voltage-transmittance) curves of the transmission zone and the reflective zone of the testing panels are illustrated. The V-T curves of the transmission zone are illustrated without the environment light and with the backlight source on status. The V-T curves of the reflective zone are illustrated with the strong environment light and with the backlight source off status. If the V-T curves of the transmission zone and the reflective zone of the testing panels are the same in the range of allowable error. The phase delay of the light passing through the transmission zone is twice as the reflective zone, and the relationship of the testing panel can be a reference in the mass production.

Embodiment 2

Figure 3:
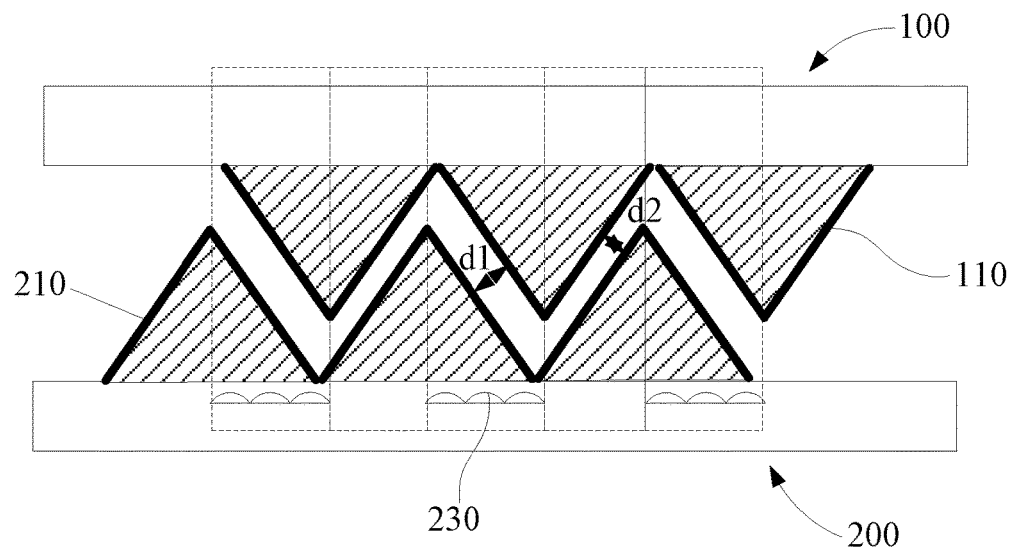
FIG. 3 is a cross-sectional view illustrating the blue phase liquid crystal display module of the second embodiment according to the present invention.

The d1>d2 is shown in the first embodiment by adjusting the distance L1/L2 of the adjacent jagged projection of the lower jagged electrodes 210. Referring to FIG. 3, FIG. 3 is a cross-sectional view illustrating the blue phase liquid crystal display module of the second embodiment according to the present invention. In this embodiment, the distance of the adjacent jagged electrodes of the upper and the lower electrode is separately fixed, the d1>d2 is controlled by adjusting the related position of the adjacent jagged projection of the jagged electrodes of the upper and the lower electrode. As shown in FIG. 3, the bottom of the upper jagged electrodes 110 and the top of the lower jagged electrodes 210 is in stagger arrangement successively in a distance to make the pitch d2 of the upper jagged electrodes 110 and the lower jagged electrodes 210 in the transmission zone is smaller than the pitch d1 of the upper jagged electrodes 110 and the lower jagged electrodes 210 in the reflective zone.

Embodiment 3

Figure 4:
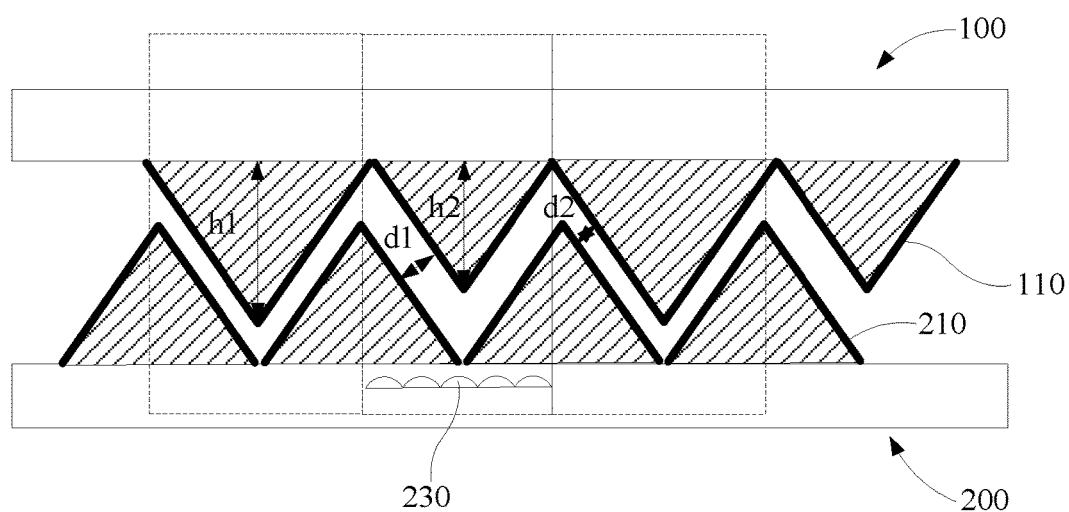
FIG. 4 is a cross-sectional view illustrating the blue phase liquid crystal display module of the third embodiment according to the present invention.

FIG. 4 is a cross-sectional view illustrating the blue phase liquid crystal display module of the third embodiment according to the present invention. The difference of this embodiment and the embodiments mentioned above, the height of the projection of the upper jagged electrodes 110 in the transmission zone and the reflective zone is different. The height h1 of the projection of the upper jagged electrodes 110 in the transmission zone is larger than the height h2 of the projection of the upper jagged electrodes 110 in the reflective zone, and makes the pitch d2 of the upper jagged electrodes 110 and the lower jagged electrodes 210 in the transmission zone is smaller than the pitch d1 of the upper jagged electrodes 110 and the lower jagged electrodes 210 in the reflective zone wherein the bottom of the of the upper jagged electrodes 110 and the top of the lower jagged electrodes 210 are corresponding formed in a proper order.

For the technology features such as the element of the apparatus, property and the fundamental principle in the second and the third embodiments can be referring to the first embodiment, and no need to have detail description.

Embodiment 4

The embodiments mentioned above are to adjust the different pitches of the upper jagged electrodes and the lower jagged electrodes in the transmission zone and the reflective zone to achieve the function of having different phase delay property in the transmission zone and the reflective zone.

Figure 5:
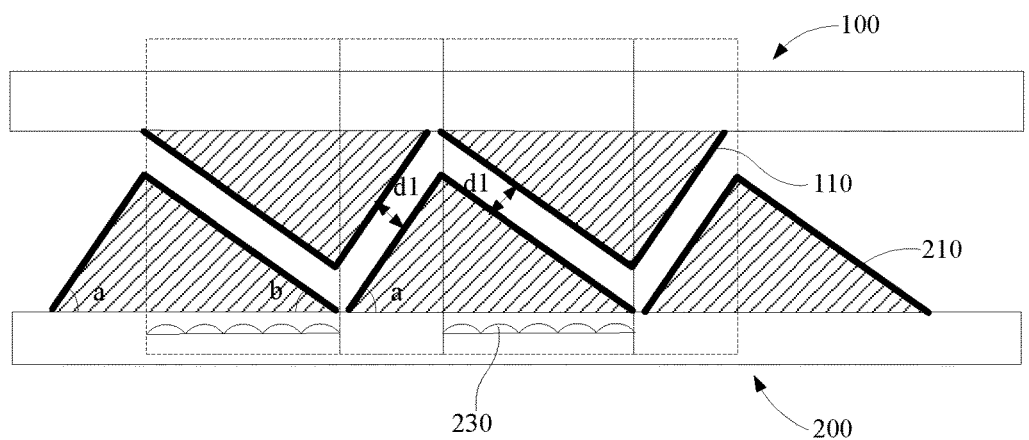
FIG. 5 a cross-sectional view illustrating the blue phase liquid crystal display module of the fourth embodiment according to the present invention

Referring to FIG. 5, FIG. 5 is a cross-sectional view illustrating the blue phase liquid crystal display module of the fourth embodiment according to the present invention. In this embodiment, the function of the different optically anisotropic property of the blue phase liquid crystal in the transmission zone and the reflective zone is achieved by adjusting the dip angle of the electrode.

To be more specifically, the projection of the jagged electrodes on the upper and the bottom substrate have the same end face structure. The dip angle of the jagged electrodes in the transmission zone is larger than the jagged electrodes in the reflective zone. In a preferred embodiment, the dip angle of the jagged electrodes in the transmission zone is larger than 45 degree, and the dip angle of the jagged electrodes in the reflective zone is smaller than 45 degree.

Figure 6:
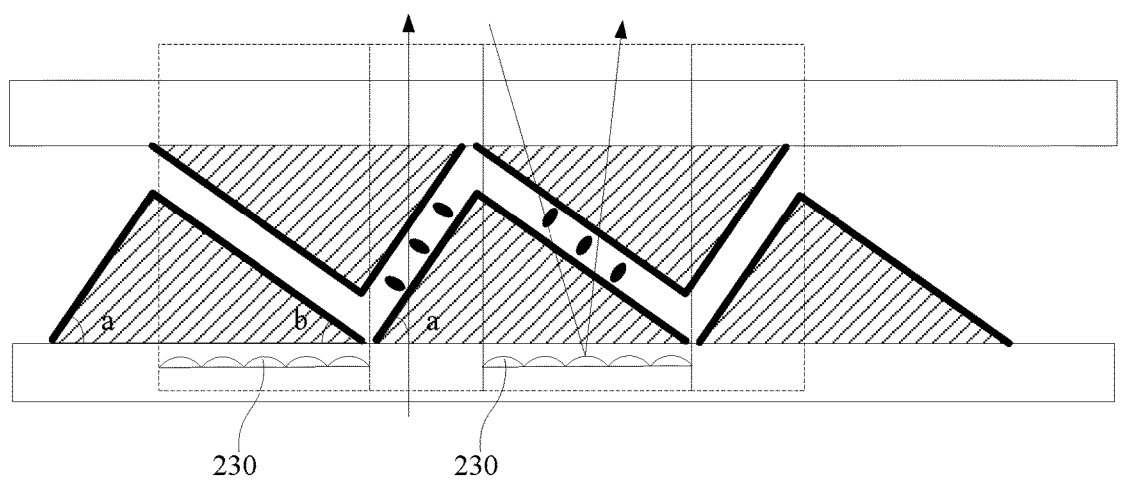
FIG. 6 is a cross-sectional view illustrating the blue phase liquid crystal display module in the energized state of the four embodiment according to the present invention illustrated in FIG. 5.

As illustrated in FIG. 5, the bilateral of one of the projection of the jagged electrodes has two dip angles a, b, the dip angles in the transmission zone is larger than the dip angle b in the reflective zone. Referring to FIG. 6, FIG. 6 is a cross-sectional view illustrating the blue phase liquid crystal display module in the energized state of the fourth embodiment according to the present invention illustrated in FIG. 5. As illustrated in FIG. 6, by applying voltage, since the dip angle a of the projection of the jagged electrodes in the transmission zone is larger than the dip angle b in the reflective zone. In this embodiment, the electrode pitch d1 in the transmission zone and the reflective zone is the same, when applying the same voltage on the transmission zone and the reflective zone, the optically anisotropic property of the blue phase liquid crystal in the transmission zone and angle between the substrate is smaller than the reflective zone. The phase delay of the transmission zone can be double of the reflective zone by adjusting the relationship of the dip angle a, b, and have uniform electro-optical characteristics in the transmission zone and the reflective zone. The value of a, b can be set by a texting methods similarly. For the other technology features can be referring to the description of the first embodiment.

It can be understand that when the dip angle of the jagged electrodes in the transmission zone is larger than the dip angle of the jagged electrodes in the reflective zone, the pitches of the upper and lower jagged electrodes in the transmission zone and the reflective zone is different as mentioned in the first to the third embodiments. The phase delay of the transmission zone can be double of the reflective zone by adjusting the relationship of the a, b, d1, d2 to have uniform electro-optical characteristics in the transmission zone and the reflective zone.

The features to be figure out are as followed. When the projections of the jagged electrodes are adjacent closely on one substrate and no distance L1, L2 is formed as shown in FIG. 1, in a preferred embodiment, the projections of the jagged electrodes are continuously on one substrate such as the structure illustrated in FIG. 3. When the projections of the jagged electrodes are not adjacent closely on one substrate and the distances L1, L2 are formed as shown in FIG. 1, the projections of the electrodes in the partial of the pixel zone or in the whole zone on one substrate are extended and connected in the surface of the substrate.

The blue phase liquid crystal display module in the embodiment of this invention, by adjusting the different electrodes pitch or the dip angle to achieve the property of the phase delay of the transmission zone differ with that of the reflective zone. It makes the accumulated phase delay of the environment light pass the crystal twice and the environment light pass the crystal once being the same. By decreasing the driving voltage, the consistent of the electro-optical properties of the transmission zone and the reflective zone is also achieved.

Figure 7:
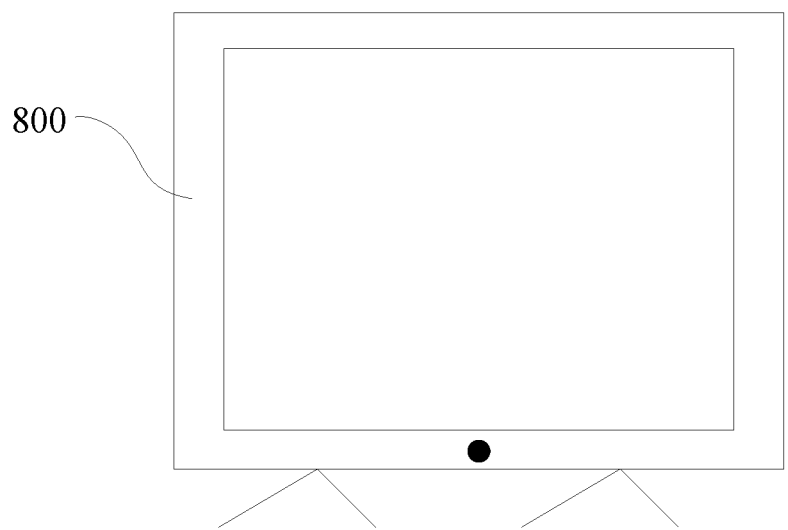
FIG. 7 is a schematic structural view of the blue phase liquid crystal display apparatus in the preferred embodiment.

Besides, a blue phase liquid crystal display apparatus is also presented in this invention. Referring to FIG. 7, FIG. 7 is a schematic structural view of the blue phase liquid crystal display apparatus in the preferred embodiment. The blue phase liquid crystal display apparatus includes the blue phase liquid crystal display module mentioned above. The blue phase liquid crystal display apparatus also includes a case 800, a control circuit (not shown) and the related structure element known by the person having ordinary skill in the art.

The foregoing description is only embodiments of the present invention, not used to limit the scope and range of the present invention. Those equivalent changes or modifications made according to the shape, structure, feature, or spirits described in the claims of the present invention are included in the appended claims of the present invention.

What is claimed is:

1. A blue phase liquid crystal display module, wherein the blue phase liquid crystal display module comprising:
    an upper substrate wherein the upper substrate having a plurality of the upper jagged electrodes;
    a lower substrate formed opposite to the upper substrate, a plurality of the lower jagged electrodes formed staggered with the upper jagged electrodes on the lower substrate; a reflection layer formed alternately on the lower substrate to divide the blue phase liquid crystal display module into a transmission zone and a reflective zone, a filler material is formed between the upper jagged electrodes and the upper substrate, and a filler material is formed between the lower jagged electrodes and the lower substrate;
    a blue phase liquid crystal formed between the upper jagged electrodes and the lower jagged electrodes; the bottom of the upper jagged electrodes and the top of the lower jagged electrodes are corresponding formed in a proper order, and the distance of the adjacent jagged projection of the lower jagged electrodes in the reflective zone is larger than the distance of the adjacent jagged projection of the lower jagged electrodes in the transmission zone to make the pitch of the upper jagged electrodes and the lower jagged electrodes in the transmission zone is smaller than the pitch of the upper jagged electrodes and the lower jagged electrodes in the reflective zone; and
    an electric field is formed between the upper jagged electrodes and the lower jagged electrodes to drive the blue phase liquid crystal to make the phase delay of the transmission zone is twice as the reflective zone and have a uniform electro-optical characteristics in the transmission zone and the reflective zone.

2. A blue phase liquid crystal display module, wherein the blue phase liquid crystal display module comprising:
    an upper substrate wherein the upper substrate having a plurality of the upper jagged electrodes;
    a lower substrate formed opposite to the upper substrate, a plurality of the lower jagged electrodes formed staggered with the upper jagged electrodes on the lower substrate; a reflection layer is formed alternately on the lower substrate to divide the blue phase liquid crystal display module into a transmission zone and a reflective zone;
    a blue phase liquid crystal formed between the upper jagged electrodes and the lower jagged electrodes; the pitch of the upper jagged electrodes and the lower jagged electrodes in the transmission zone is smaller than the pitch of the upper jagged electrodes and the lower jagged electrodes in the reflective zone; and
    an electric field is formed between the upper jagged electrodes and the lower jagged electrodes to drive the blue phase liquid crystal to make the phase delay of the transmission zone is twice as the reflective zone and have a uniform electro-optical characteristics in the transmission zone and the reflective zone.

3. The blue phase liquid crystal display module according to claim 2, further comprising a filler material formed between the upper jagged electrodes and the upper substrate.

4. The blue phase liquid crystal display module according to claim 2, further comprising a filler material formed between the between the lower jagged electrodes and the lower substrate.

5. The blue phase liquid crystal display module according to claim 2, wherein the bottom of the upper jagged electrodes and the top of the lower jagged electrodes is are corresponding formed in a proper order, and the distance of the adjacent jagged projection of the lower jagged electrodes in the reflective zone is larger than the distance of the adjacent jagged projection of the lower jagged electrodes in the transmission zone to make the pitch of the upper jagged electrodes and the lower jagged electrodes in the transmission zone is smaller than the pitch of the upper jagged electrodes and the lower jagged electrodes in the reflective zone.

6. The blue phase liquid crystal display module according to claim 2, wherein the bottom of the upper jagged electrodes and the top of the lower jagged electrodes are in stagger arrangement successively in a distance to make the pitch of the upper jagged electrodes and the lower jagged electrodes in the transmission zone is smaller than the pitch of the upper jagged electrodes and the lower jagged electrodes in the reflective zone.

7. The blue phase liquid crystal display module according to claim 2, wherein the bottom of the upper jagged electrodes and the top of the lower jagged electrodes is are corresponding formed in a proper order, and the height of the projection in the transmission zone is larger than the height of the projection in the reflective zone, and makes the pitch of the upper jagged electrodes and the lower jagged electrodes in the transmission zone is smaller than the pitch of the upper jagged electrodes and the lower jagged electrodes in the reflective zone.

8. The blue phase liquid crystal display module according to claim 2, wherein the dip angle of the jagged electrodes in the transmission zone is larger than the dip angle of the jagged electrodes in the reflective zone.

9. The blue phase liquid crystal display module according to claim 8, wherein the dip angle of the jagged electrodes in the transmission zone is larger than 45 degree and the dip angle of the jagged electrodes in the reflective zone is smaller than 45 degree.

10. A blue phase liquid crystal display apparatus, wherein the blue phase liquid crystal display apparatus comprising a blue phase liquid crystal display module and the blue phase liquid crystal display module comprising:
    an upper substrate wherein the upper substrate having a plurality of the upper jagged electrodes;
    a lower substrate formed opposite to the upper substrate, a plurality of the lower jagged electrodes formed staggered with the upper jagged electrodes on the lower substrate; a reflection layer is formed alternately on the lower substrate to divide the blue phase liquid crystal display module into a transmission zone and a reflective zone;

a blue phase liquid crystal formed between the upper jagged electrodes and the lower jagged electrodes;

the pitch of the upper jagged electrodes and the lower jagged electrodes in the transmission zone is smaller than the pitch of the upper jagged electrodes and the lower jagged electrodes in the reflective zone; and an electric field is formed between the upper jagged electrodes and the lower jagged electrodes to drive the blue phase liquid crystal to make the phase delay of the transmission zone is twice as the reflective zone and have a uniform electro-optical characteristics in the transmission zone and the reflective zone.

11. The blue phase liquid crystal display apparatus according to claim 10, further comprising a filler material formed between the upper jagged electrodes and the upper substrate.

12. The blue phase liquid crystal display apparatus according to claim 10, further comprising a filler material formed between the between the lower jagged electrodes and the lower substrate.

13. The blue phase liquid crystal display apparatus according to claim 10, wherein the bottom of the upper jagged electrodes and the top of the lower jagged electrodes is are corresponding formed in a proper order, and the distance of the adjacent jagged projection of the lower jagged electrodes in the reflective zone is larger than the distance of the adjacent jagged projection of the lower jagged electrodes in the transmission zone to make the pitch of the upper jagged electrodes and the lower jagged electrodes in the transmission zone is smaller than the pitch of the upper jagged electrodes and the lower jagged electrodes in the reflective zone.

14. The blue phase liquid crystal display apparatus according to claim 10, wherein the bottom of the upper jagged electrodes and the top of the lower jagged electrodes are in stagger arrangement successively in a distance to make the pitch of the upper jagged electrodes and the lower jagged electrodes in the transmission zone is smaller than the pitch of the upper jagged electrodes and the lower jagged electrodes in the reflective zone.

15. The blue phase liquid crystal display apparatus according to claim 10, wherein the bottom of the upper jagged electrodes and the top of the lower jagged electrodes is are corresponding formed in a proper order, and the height of the projection in the transmission zone is larger than the height of the projection in the reflective zone, and makes the pitch of the upper jagged electrodes and the lower jagged electrodes in the transmission zone is smaller than the pitch of the upper jagged electrodes and the lower jagged electrodes in the reflective zone.

16. The blue phase liquid crystal display apparatus according to claim 10, wherein the dip angle of the jagged electrodes in the transmission zone is larger than the dip angle of the jagged electrodes in the reflective zone.

17. The blue phase liquid crystal display apparatus according to claim 10, wherein the dip angle of the jagged electrodes in the transmission zone is larger than 45 degree and the dip angle of the jagged electrodes in the reflective zone is smaller than 45 degree.

* * * * *